United States Patent
Sergeev et al.

(10) Patent No.: US 9,913,304 B2
(45) Date of Patent: Mar. 6, 2018

(54) METHOD AND SYSTEM FOR FACILITATING THE ESTABLISHMENT OF A VIRTUAL PRIVATE NETWORK IN A CELLULAR COMMUNICATION NETWORK

(71) Applicant: ADVA Optical Networking SE, Meiningen (DE)

(72) Inventors: Andrew Sergeev, Kfar Saba (IL); Evgeny Zemlerub, Netanya (IL); Eyal Ben-Sa'adon, Karkur (IL)

(73) Assignee: Adva Opticai Networking SE, Meiningen (DE)

( * ) Notice: Subject to any disclaimer, the term of this patent is extended or adjusted under 35 U.S.C. 154(b) by 183 days.

(21) Appl. No.: 14/818,823

(22) Filed: Aug. 5, 2015

(65) Prior Publication Data
US 2016/0044723 A1 Feb. 11, 2016

(30) Foreign Application Priority Data
Aug. 8, 2014 (EP) .................................... 14002784

(51) Int. Cl.
*H04W 76/02* (2009.01)
*H04L 29/06* (2006.01)
*H04W 24/08* (2009.01)
*H04L 29/12* (2006.01)

(52) U.S. Cl.
CPC ....... *H04W 76/022* (2013.01); *H04L 63/0272* (2013.01); *H04L 69/08* (2013.01); *H04W 24/08* (2013.01); *H04L 61/251* (2013.01)

(58) Field of Classification Search
CPC ... H04L 61/251; H04L 69/08; H04L 63/0272; H04W 76/022; H04W 24/08
See application file for complete search history.

(56) References Cited

U.S. PATENT DOCUMENTS

| | | | |
|---|---|---|---|
| 7,516,174 B1* | 4/2009 | Tashjian | H04L 12/4641 455/403 |
| 8,516,569 B2* | 8/2013 | Babula | H04L 63/0272 726/15 |
| 2006/0143703 A1* | 6/2006 | Hopen | G06F 21/6218 726/15 |
| 2006/0164975 A1* | 7/2006 | Filsfils | H04L 45/00 370/225 |

(Continued)

OTHER PUBLICATIONS

Antipolis, "Functional Architecture for M2M Networks," Alcatel-Lucent, 2009, pp. 1-6.

*Primary Examiner* — Ajay Cattungal
(74) *Attorney, Agent, or Firm* — The Webb Law Firm (57) ABSTRACT

A method for facilitating the establishment of a virtual private network in a cellular communication network comprising the steps of: arranging a network interface device in close proximity to a plurality of antennas; identifying an access request from a client device to establish a virtual private network connection through a core network portion by means of the network interface device; determining application information from the client device by means of the net-work interface device; and comparing the application information to a network information of the core net-work portion to determine whether the application information matches the net-work information by means of the network interface device.

14 Claims, 3 Drawing Sheets

(56) References Cited

U.S. PATENT DOCUMENTS

| | | | |
|---|---|---|---|
| 2006/0193248 A1* | 8/2006 | Filsfils | H04L 45/04 370/216 |
| 2006/0221813 A1* | 10/2006 | Scudder | H04L 45/02 370/216 |
| 2007/0237115 A1* | 10/2007 | Bae | H04L 12/2834 370/331 |
| 2007/0271606 A1* | 11/2007 | Amann | H04W 12/02 726/15 |
| 2012/0036567 A1* | 2/2012 | Senese | H04L 9/0838 726/7 |
| 2012/0264443 A1* | 10/2012 | Ng | H04W 4/005 455/450 |
| 2012/0327811 A1* | 12/2012 | Nozaki | H04L 12/462 370/255 |
| 2013/0254855 A1* | 9/2013 | Walters | G06F 21/60 726/5 |

* cited by examiner

METHOD AND SYSTEM FOR FACILITATING THE ESTABLISHMENT OF A VIRTUAL PRIVATE NETWORK IN A CELLULAR COMMUNICATION NETWORK

CROSS REFERENCE TO RELATED APPLICATION

This application claims priority to European Patent Application No. 14 002 784.8 filed Aug. 8, 2014, the disclosure of which is hereby incorporated in its entirety by reference.

BACKGROUND OF THE INVENTION

Field of the Invention

The present invention relates to a method and a system for facilitating the establishment of a virtual private network (VPN) in a cellular communication network, in particular to a method and a system for facilitating the establishment of a virtual private network in a cellular communication network connecting client devices irrespective of the Mobile Network Operators (MNO) the client devices are associated with.

Description of Related Art

Affairs of individuals and enterprises are increasingly being conducted in an automated manner over the Internet. For example, enterprises engage in selling their products and services over the Internet, individuals engage in communicating with one another over the Internet and employees may also access secure resources of their employers over the Internet.

When employees access secure assets of an enterprise over the Internet, the enterprise has to ensure that the access is secure. One mechanism to achieve this is the establishment of a VPN connection.

A VPN extends a private network across a public network, such as the Internet. It enables a computer to send and receive data across shared or public networks as if it is directly connected to the private network, while benefiting from the functionality, security and management policies of the private network. A VPN is created by establishing a virtual point-to-point connection through the use of dedicated connections, virtual tunneling protocols, or traffic encryptions.

U.S. Pat. No. 8,516,569 B2 discloses techniques for uninterrupted VPN connection service with dynamic policy enforcement. Here, a request is received in order to change an Internet Protocol (IP) address for an existing VPN session between a VPN client and a VPN server. The new IP address is to replace an existing IP address being used in the existing VPN session. Next, a VPN connection table entry is updated for the VPN session with the new IP address. Finally, a new credential is supplied to the VPN client for automatically re-authenticating during the existing VPN session to the new IP address without the VPN client losing service to the existing VPN session.

Today, VPN is either based on customer equipment or on cellular communication networks. Using customer equipment for the establishment of a VPN connection might result in low latency, however the deployment of the customer equipment is not always possible. On the other hand, facilitating the establishment of a virtual private network in a cellular communication network of a specific MNO requires that all members of the VPN belong to the same MNO. However, there might be situations when machine to machine (M2M) interaction might need low latency communication while subjects are belonging to different MNOs.

Therefore, methods for facilitating the establishment of a virtual private network with low latency are desirable.

SUMMARY OF THE INVENTION

The present invention provides a method for facilitating the establishment of a virtual private network in a cellular communication network, wherein the cellular communication network comprises a plurality of core network portions and a plurality of antennas. Each antenna is associated with a core network portion. The method comprises the steps of arranging a network interface in close proximity to the plurality of antennas, identifying an access request from a client device to establish a virtual private network connection through a core network portion by means of the network interface device, determining application information from the client device by means of the network interface device and comparing the application information to a network information of the core network portion to determine whether the application information matches the network information by means of the network interface device. If the application information matches the network information, a virtual private network connection of the client device is established through the core network portion using the application information by means of the network interface device. Further, if the application information does not match the network information, the application information is translated into an information valid in the virtual private network connection of the client device by means of the network interface device.

The method is based on a network interface device arranged in close proximity to the plurality of antennas and part of mobile backhauling, thus monitors the mobile backhaul of the core network portions, and which is used to establish a virtual private network connection of the client device through the core network portion. If the network interface device identifies an access request from a client device to establish a VPN connection through a core network portion, it determines whether an application information of the client device matches a network information of the core network portion and performs address translation if the application information does not match the network information in order to establish the VPN connection. Thus, there are two cases processed at the network interface device, in particular regular traffic towards a core network portion and the establishment of a VPN connection with low latency. Further, VPN forwarding is performed by the network interface device with or without sending the traffic towards a core network portion and receiving back the traffic, with low latency. Thus, no further administrative actions or interventions are needed to establish the VPN connection. Since the network interface device performs address translation if the application information does not match the network information, a virtual private network connection of the client device can be established irrespective of the MNO the client device is associated with or an actual location of the client device. Further, since the network interface device is arranged in such a way that the network interface device can monitor the mobile backhaul of the core network portions, in particular a shared backhaul, an access request from a client device can be identified at a very early point in time, wherein the network interface device can act as a switching unit for routing data flow between client devices served by proxime antennae. Thus, a VPN connection can be established with low latency.

The step of identifying an access request from a client device to establish a virtual private network connection through the core network portion by means of the network interface device can comprise the step of monitoring data flow from the plurality of antennas to the plurality of core network portions. Common data packets within the data flow usually are composed of a data part and a characterizing part, the header. In such packets, the header typically contains a source address characterizing the sending device and a destination address characterizing the network element designated to receive the data packet. Thus, by monitoring data flow from the plurality of antennas, data packets within the flow of data can be inspected and a client device the data flow originates from as well as a dedicated core network portion can be determined and thereon the data flow can be transmitted between client devices, thereby establishing a VPN connection of the client device, irrespective of an MNO the client device is associated with or an actual location of the client device.

The step of monitoring data flow from the plurality of antennas to the plurality of core network portions can further comprise performing deep packet inspection. Deep packet inspection is a technique to examine the data contained in layers up to and including the application layer of each data packet which includes the characterizing part of the data packet, thus to examine the characterizing part of the data packet, in order to determine what treatment should be used for the packet. For example, deep packet inspection matches the structure of the application layer data with potentially hundreds of known application data types.

Further, the step of comparing the application information to a network information of the core network portion to determine whether the application information matches the network information by means of the network interface device can comprise the step of determining whether the application information matches an entry in a look-up table provided in the network interface device, wherein the entry in the look-up table further includes the network information. In computer science, a look-up table is an array that replaces runtime computation with a simpler array indexing operation. The savings in terms of processing time can be significant, since retrieving a value from a memory is often faster than undergoing an expensive computation or an input/output operation. Here, the tables may be precalculated and stored in static program storage, calculated as part of a program's initialization phase, or even stored in hardware in application-specific platforms. Thus, the establishment of a VPN connection with low latency can be ensured.

In some embodiments, the application information can include a destination IP address and the network information as well as the information valid in the VPN connection of the client device can include a common network address. An IP address is a numerical label assigned to each device participating in a computer network that uses the Internet Protocol for communication. An IP address serves two principal functions, host or network interface identification and location addressing.

The step of translating the application information into information valid in the VPN connection of the client device if the application information does not match the network information by means of the network interface device comprises performing IP translation. Thus, since methods such as Network address translation (NAT) which is a methodology of modifying network address information in Internet Protocol (IP) data packet headers while they are in transit across a traffic routing device for the purpose of remapping one IP address space into another are known, it can be ensured that the network interface device can perform the translation of the application information, in particular the destination IP address, into the information valid in the VPN connection of the client device, in particular the common network information, thus routing data flow at a very early point in time and, therefore, the data flow is hairpinned before the core network portion, thereby ensuring the establishment of a VPN with low latency.

The method can further comprise the step of updating the look-up table provided in the network interface device by adding a new entry in the look-up table including the application information and the information valid in the VPN connection of the client device, if the application information does not match the network information. Thereby, all users that are currently connected to the same VPN can be enlisted into the look-up table for easier discovery.

The present invention further provides a system for facilitating the establishment of a virtual private network in a cellular communication network. The cellular communication network comprises a plurality of core network portions and a plurality of antennas, wherein each antenna is associated with a core network portion. The system further comprises a network interface device arranged in close proximity to the plurality of antennas, wherein the network interface device comprises an identifying means for identifying an access request from a client device to establish a virtual private network connection through a core network portion, a determining means for determining application information from the client device, a comparing means for comparing the application information to a network information of the core network portion to determine whether the application information matches the network information, a first connection means for establishing a virtual private network connection of the client device through the core network portion using the application information if the application information matches the network information, a translation means for translating the application information into an information valid in a virtual private network connection of the client device if the application information does not match the network information and a second connection means for establishing a virtual private connection of the client device using the information valid in the virtual private network connection of the client device if the application information does not match the network information.

The system is based on a network interface device arranged in close proximity to the plurality of antennas, which is part of mobile backhauling, thus monitors the mobile backhaul of the core network portions, and which is used to establish a virtual private network connection of the client device through the core network portion of the cellular network. If the identifying means of the network interface device identifies an access request from a client device to establish a virtual private network connection through a core network portion, the comparing means determines whether an application information of the client device matches a network information of the core network portion and the translation means performs address translation if the application information does not match the network information in order to establish the VPN connection. Thus, there are two cases processed at the network interface device, in particular regular traffic towards a core network portion and the establishment of a VPN connection with low latency. Further, VPN forwarding is performed by the network interface device without sending the traffic towards a core network portion and receiving back the traffic, with low latency. Thus, no further administrative action or interventions are needed within the system to establish the VPN connection.

Since the translation means of the network interface device performs address translation if the application information does not match the network information, a virtual private network connection of the client device can be established irrespective of the MNO the client device is associated with or an actual location of the client device. Further, since the network interface device is arranged in such a way that the network interface device can monitor the mobile backhaul of the core network portions, in particular a shared backhaul, the identifying means can identify an access request from a client device at a very early point in time, wherein the network interface device can act as a switching unit for routing data flow between client devices served by proxime antennae. Thus, a VPN connection can be established with low latency.

The identifying means can include a monitoring means for monitoring data flow from the plurality of antennas to the plurality of core network portions. Common data packets within the data flow usually are composed of a data part and a characterizing part, the header. In such packets the header typically contains a source address characterizing the sending device and a destination address characterizing the network element designated to receive the data packet. Thus, by monitoring data flow from the plurality of antennas by the monitoring means, data packets within the flow of data can be inspected and the network interface device can determine a client device the data flow originates from as well as a dedicated core network portion and, thereon, the data flow can be transmitted to the dedicated core network portion, thereby establishing a VPN connection of the client device through the respective core network portion, irrespective of an MNO the client device is associated with or an actual location of the client device.

The monitoring means can include a means for performing packet inspection. Deep packet inspection is a technique to examine the data contained in layers up to and including the application layer of each data packet which includes the characterizing part of the data packet, thus to examine the characterizing part of the data packet, in order to determine what treatment should be used for the packet. For example, deep packet inspection matches the structure of the application layer data with potentially hundreds of known application data types.

In some embodiments, the network interface device further includes a storage unit in which a look-up table is stored. Further, the comparing means can determine whether the application information matches an entry in the look-up table, wherein the entry in the look-up table further includes the network information. In computer science, a look-up table is an array that replaces runtime computation with a simpler array indexing operation. The savings in terms of processing time can be significant, since retrieving a value from a memory is often faster than undergoing an expensive computation or an input/output operation. The tables may be precalculated and stored in static program storage, calculated as part of a program's initialization phase, or even stored in hardware in application-specific platforms. Thus, the establishment of a VPN connection with low latency can be ensured by the system.

Further, the application information can include a destination IP address and the network information as well as the information valid in VPN connection of the client device can include a common network address. An IP address is a numerical label assigned to each device participating in a computer network that uses the Internet Protocol for communication. An IP address serves two principal functions, host or network interface identification and location addressing.

Therefore, the translation means can include a network address translation device. Thus, since network address translation devices based on methods such as Network address translation (NAT) which is a methodology of modifying network address information in Internet Protocol (IP) data packet headers while they are in transit across a traffic routing device for the purpose of remapping one IP address space into another are known, it can be ensured that the translation means of the network interface device can perform the translation of the application information, in particular the destination IP address, into the information valid in the VPN connection of the client device, in particular the common network information, thus routing data flow at a very early point in time and, therefore, the data flow is hairpinned before the core network portion, thereby ensuring the establishment of a VPN with low latency.

Furthermore, the network interface device can include an updating means for updating the look-up table provided in the network interface device, which includes a writing means for adding a new entry in the look-up table including the application information and the information valid in the VPN connection of the client device, if the application information does not match the network information. Thereby, all users that are currently connected to the same VPN can be entered into the look-up table for easier discovery.

BRIEF DESCRIPTION OF THE DRAWINGS

Embodiments of the invention will now be described with reference to the drawings in which.

DESCRIPTION OF THE INVENTION

Figure 1:
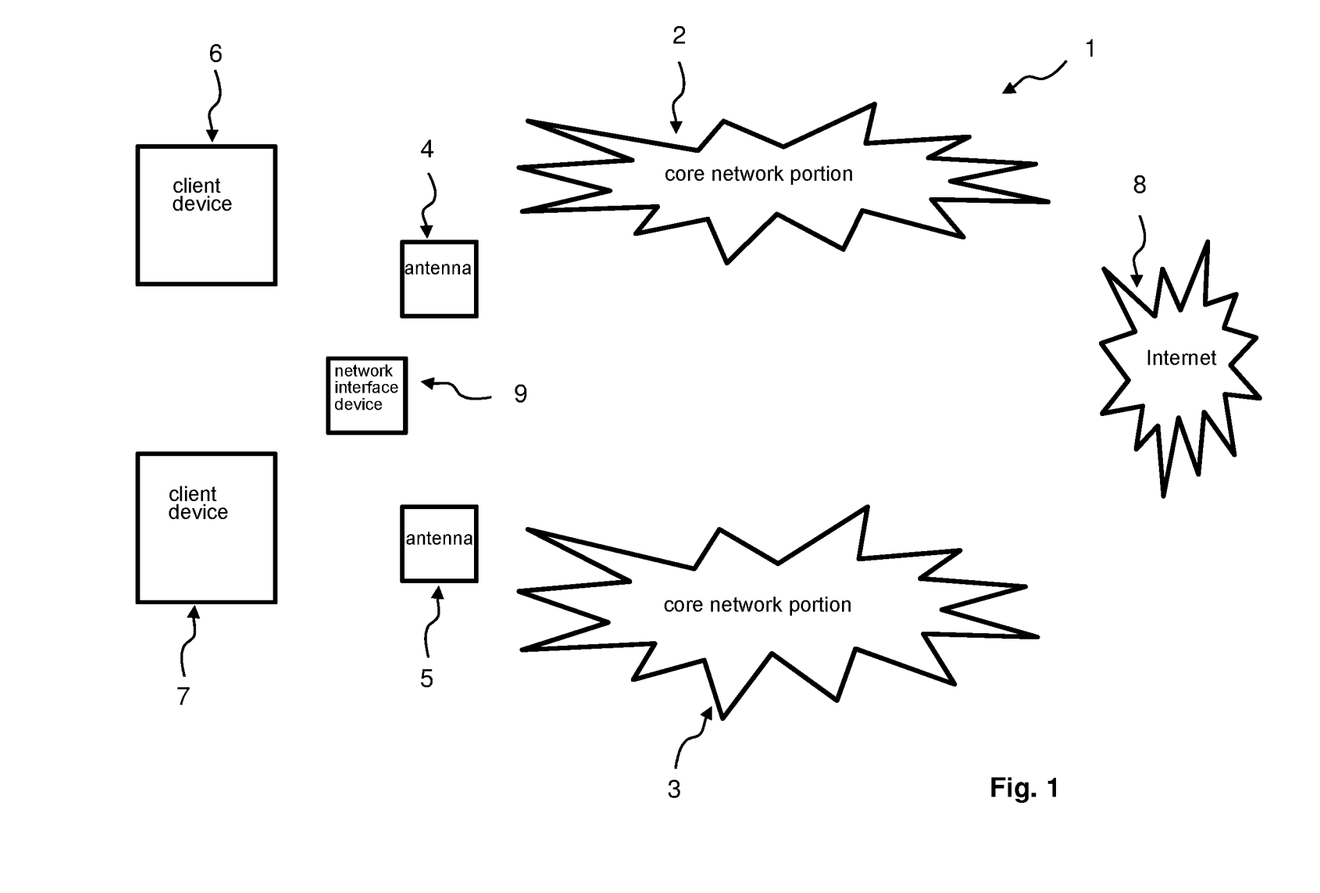
FIG. 1 illustrates a system for facilitating the establishment of a virtual private network in a cellular communication network according to a first embodiment.

FIG. 1 illustrates a system 1 for facilitating the establishment of a virtual private network in a cellular communication network according to a first embodiment.

As can be seen in FIG. 1, a given geographical area is subdivided into a number of smaller radio coverage areas, the core network portions 2, 3, to define the cellular communication network. Further, each core network portion is provided with a base radio station, in particular an antenna 4, 5.

There are further shown two client devices 6, 7, which might try to communicate with each other or the Internet 8, for example an enterprise network.

One mechanism to achieve this is the establishment of a virtual private network (VPN) connection.

A VPN extends a private network across a public network, such as the Internet. It enables a computer to send and receive data across shared or public networks as if it is directly connected to the private network, while benefiting from the functionality, security and management policies of the private network. A VPN is created by establishing a virtual point-to-point connection through the use of dedicated connections, virtual tunneling protocols, or traffic encryptions.

As can be seen in FIG. 1, a network interface device 9 is arranged in close proximity to the antennas 4, 5, in order to facilitate the establishment of a VPN connection with low latency. The network interface device 9 is accomplished to monitor the mobile backhaul of the core network portions and is used to establish a VPN connection of the client device 6, 7 through the core network portion 2, 3 of the cellular network. In particular, if the network interface device identifies an access request from a client device 6, 7 to establish a VPN connection through a core network portion 4, 5, the network interface device 9 determines whether an application information of the client device 6, 7 matches a network information of the core network portion 4, 5 and performs address translation if the application information does not match the network information in order to establish the VPN connection. Thus, no further administrative actions or interventions are needed within the system 1 to establish the VPN connection. Since the network interface device 9 performs address translation if the application information does not match the network information, a virtual private network connection of the client device 6, 7 can be established irrespective of the Mobile Network Operator (MNO) the client device 6, 7 is associated with or an actual location of the client device 6, 7. Further, since the network interface device 9 is arranged in such a way that the network interface device 9 can monitor the mobile backhaul of the core network portions 4, 5, in particular a shared backhaul, the network interface device 9 can identify an access request from a client device 6, 7 at a very early point in time, wherein the network interface device 9 can act as a switching unit for routing data flow from a client device 6, 7 to a respective core network portion 4, 5. In particular, the network interface device 9 can route the data flow from the client device 6, 7 to a respective core network portion 2, 3 via a tunnel established between the core network portion 6, 7 and the respective antenna 4, 5. Such mobility tunnels carry data traffic from an antenna to a core network portion. Thus, a VPN connection can be established with low latency. Furthermore, a proper VPN tunnel can be established between the client device 6, 7 and the network interface device 9, too, upon detection of a specific flow, in order to increase transport level security.

Figure 2:
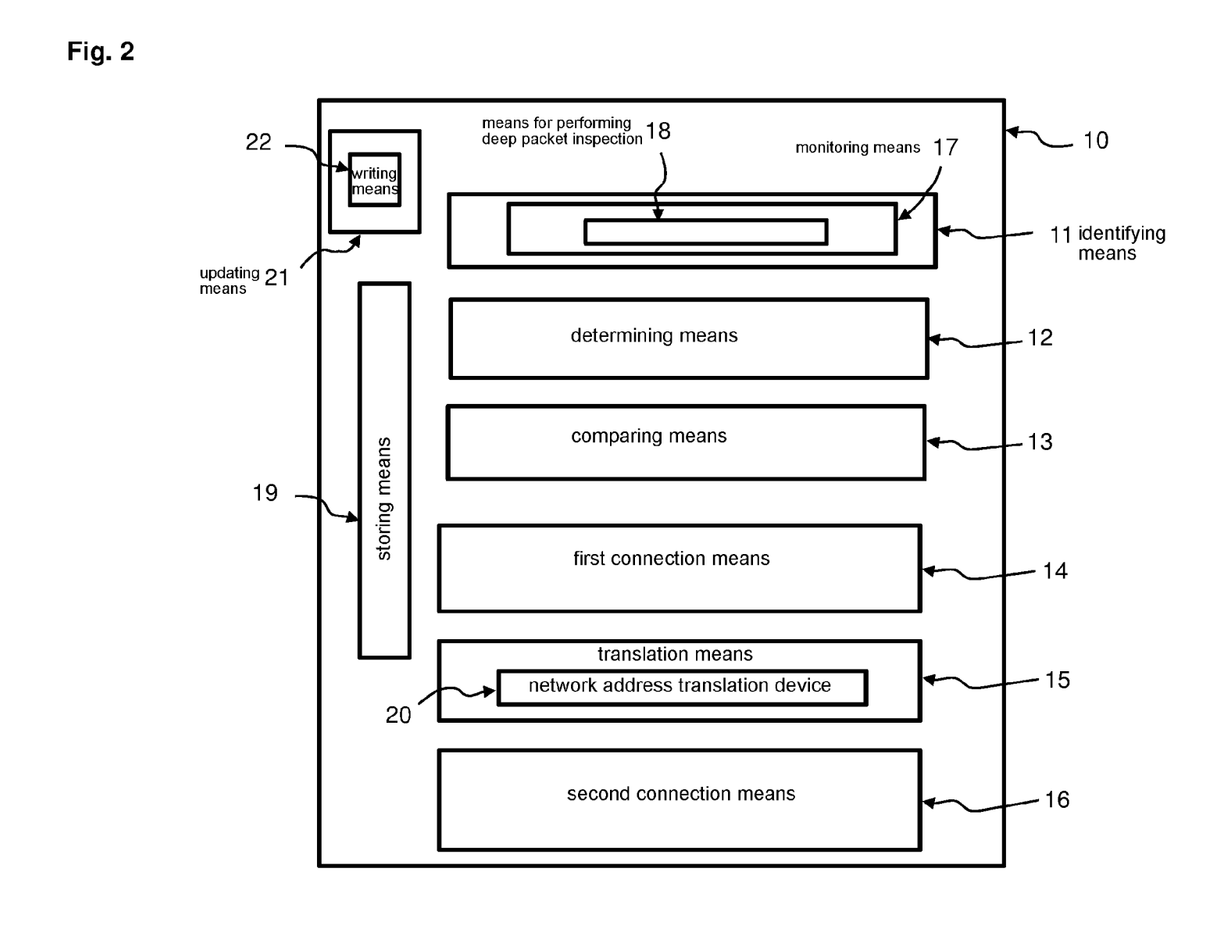
FIG. 2 illustrates a network interface device of a system for facilitating the establishment of a virtual private network in a cellular communication network according to a second embodiment and FIG. 3 illustrates a flow chart of a method for facilitating the establishment of a virtual private network in a cellular communication network according to a third embodiment.

FIG. 2 illustrates a network interface device 10 of a system for facilitating the establishment of a virtual private network in a cellular communication network according to a second embodiment.

According to the embodiment shown in FIG. 2, the network interface device 10 comprises an identifying means 11 for identifying an access request from a client device to establish a VPN connection through a core network portion, a determining means 12 for determining an application information from the client device, a comparing means 13 for comparing the application information to a network information of the core network portion to determine whether the application information matches the network information, a first connection means 14 for establishing a VPN connection of the client device through the core network portion using the application information if the application information matches the network information, a translation means 15 for translating the application information into an information valid in the VPN connection of the client device if the application information does not match the network information and a second connection means 16 for establishing a VPN connection of the client device using the information valid in the virtual private network connection of the client device if the application information does not match the network information.

The identifying means 11 further includes a monitoring means 17 for monitoring data flow from the antennas to the core network portions. Since common data packets within the data flow usually are composed of a data part and a characterizing part, the header, wherein the header typically contains a source address characterizing the sending device and a destination address characterizing the network element designated to receive the data packet, by monitoring data flow from the plurality of antennas by the monitoring means, data packets within the flow of data can be inspected and the network interface device can determine a client device the data flow originates from as well as a dedicated core network portion.

The shown monitoring means further includes a means for performing deep packet inspection 18. Deep packet inspection is a technique to examine the data contained in layers up to and including the application layer of each data packet which includes the characterizing part of the data packet, thus to examine the characterizing part of the data packet, in order to determine what treatment should be used for the packet. For example, deep packet inspection matches the structure of the application layer data with potentially hundreds of known application data types.

There is further shown a storage unit 19 in which a look-up table is stored. Here, the comparing means 13 determines whether the application information matches an entry in the lookup table, wherein the entry in the look-up table further includes the network information. Thus, the comparing means 13 can use code of a look-up table stored within the network interface device 10 to provide a comparison in form of a look-up comparing the application information with the entries in the look-up table.

According to the embodiment shown in FIG. 2, the application information includes a destination IP address and the network information as well as the information valid in the VPN connection of the client device include common network addresses. Here, the destination address as well as the common network address may, for example, be an IPv4 or an IPv6 address. Internet Protocol version 6 (IPv6) is an improved addressing scheme over Internet Protocol version 4 (IPv4). IPv6 uses a 128 bit addressing scheme and may enable much larger connectivity than IPv4 in the Internet.

Since many IPv4 systems may not be capable of using IPv6 addressing, there is a need for translating the IPv6 addresses into IPv4 addresses, for example if the application information is an IPv6 address, whereas the core network portion is an IPv4 system. Therefore, the translation means 15 shown in FIG. 2 includes a network address translation device 20. Such a network address translation device 20 is based on a method such as Network address translation (NAT) which is a methodology of modifying network address information in Internet Protocol (IP) data packet headers while they are in transit across a traffic routing device for the purpose of remapping one IP address space into another, for example to translate an IPv6 address into an IPv4 address and, therefore, to support coexistence of IPv4 and IPv6 addresses.

There is further shown an updating means 21 for updating the look-up table provided in the network interface device 10. The updating means 21 includes a writing means 22 for adding a new entry in the look-up table including the application information and the information valid in the VPN connection of the client device, if the application information does not match the network information.

Thereby, all users that are currently connected to the same VPN can be entered into the look-up table for easier discovery.

Figure 3:
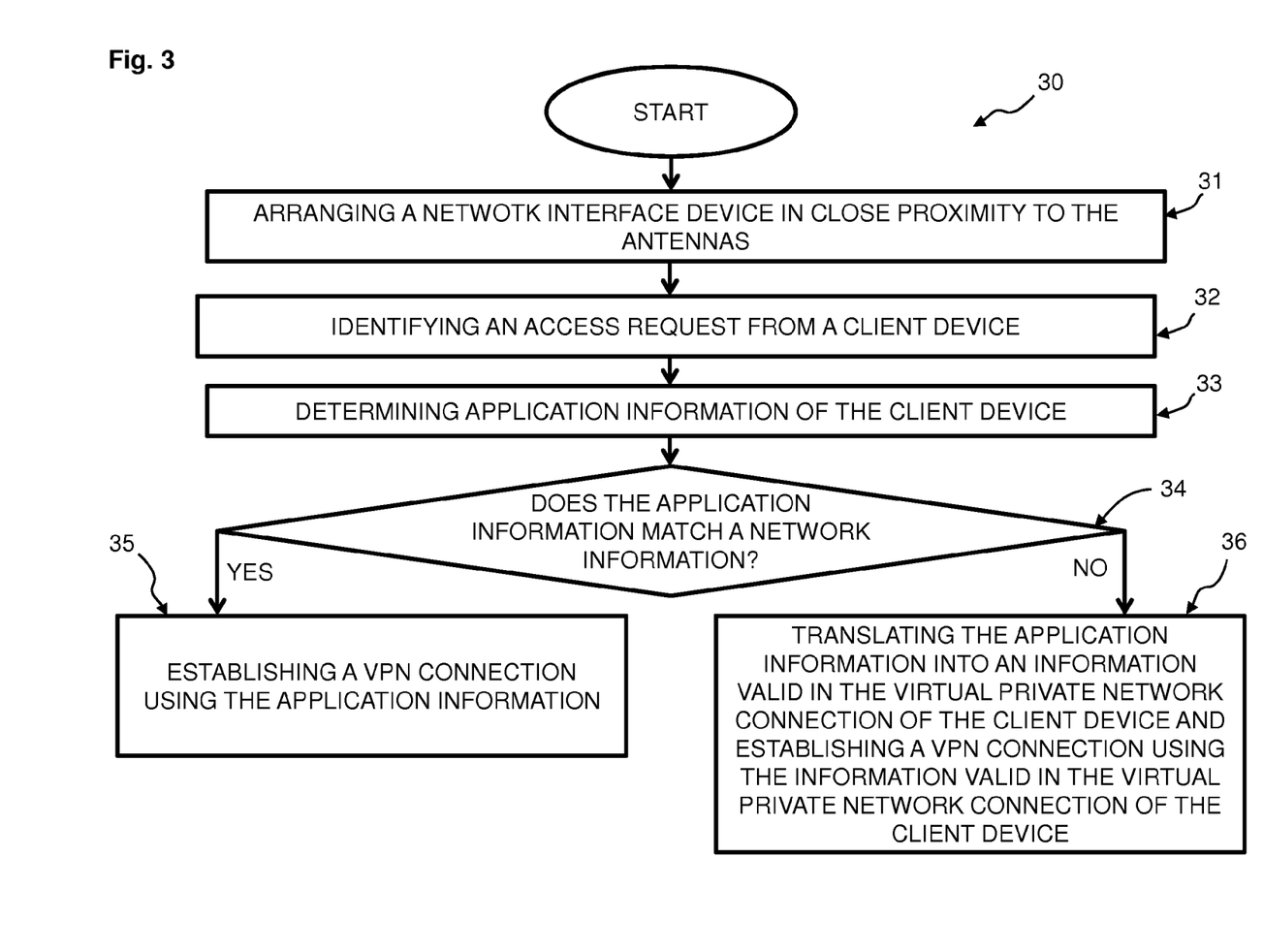

FIG. 3 illustrates a flow chart of a method 30 for facilitating the establishment of a virtual private network in a cellular communication network according to a third embodiment.

In particular, FIG. 3 illustrates a method 30 for facilitating the establishment of a virtual private network in a cellular communication network, wherein the cellular communication network comprises a plurality of core network portions and a plurality of antennas. Each antenna is associated with a core network portion. The method comprises the steps of arranging a network interface in close proximity to the plurality of antennas 31, identifying an access request from a client device to establish a virtual private network connection through a core network portion by means of the network interface device 32, determining application information from the client device by means of the network interface device 33 and comparing the application information to a network information of the core network portion to determine whether the application information matches the network information by means of the network interface device 34. If the application information matches the network information, a virtual private network connection of the client device is established through the core network portion using the application information by means of the network interface device, at step 35. Further, if the application device does not match the network information, the application information is translated into an information valid in VPN connection of the client device and a virtual private network connection of the client device is established by means of the network interface device using the information valid in the VPN connection of the client device, at step 36.

The method 30 is based on a network interface device arranged in close proximity to the plurality of antennas, which monitors the mobile backhaul of the core network portions and which is used to establish a virtual private network connection of the client device through the core network portion. If the network interface device identifies an access request from a client device to establish a virtual private network connection through a core network portion, it determines whether an application information of the client device matches a network information of the core network portion and performs address translation if the application information does not match the network information in order to establish the VPN connection. Since the network interface device performs address translation if the application information does not match the network information, a virtual private network connection of the client device can be established irrespective of the MNO the client device is associated with or an actual location of the client device. Further, since the network interface device is arranged in such a way that the network interface device can monitor the mobile backhaul of the core network portions, in particular a shared backhaul, an access request from a client device can be identified at a very early point in time, wherein the network interface device can act as a switching unit for routing data flow from a client device to a respective core network portion. Thus, a VPN connection can be established with low latency.

LIST OF REFERENCE SIGNS 1 system
2 core network portion
3 core network portion
4 antenna
5 antenna
6 client device
7 client device
8 Internet
9 network interface device
10 network interface device
11 identifying means
12 determining means
13 comparing means
14 first connection means
15 translation means
16 second connection means
17 monitoring means
18 means for performing deep packet inspection
19 storing means
20 network address translation device
21 updating means
22 writing means
30 method
31 step
32 step
33 step
34 step
35 step
36 step

The invention claimed is:

1. A method for facilitating the establishment of a virtual private network in a cellular communication network, the cellular communication network comprising a plurality of core network portions and a plurality of antennas, each antenna being associated with a core network portion, the method comprising the steps of:

arranging a network interface device in close proximity to the plurality of antennas, and part of a mobile backhauling of the core network portions;

identifying an access request from a client device to establish a virtual private network connection through a core network portion by means of the network interface device;

determining application information from the client device by means of the network interface device;

comparing the application information to a network information of the core network portion to determine whether the application information matches the network information by means of the network interface device;

if the application information matches the network information, establishing a virtual private network connection of the client device through the core network portion using the application information by means of the network interface device;

if the application information does not match the network information, translating the application information into an information valid in the virtual private network connection of the client device and establishing a virtual private network connection of the client device using the information valid in the virtual private network connection of the client device by means of the network interface device, wherein the network interface device routes data from the client device to the core network portion via a tunnel established between the core network portion and the respective antenna.

2. The method according to claim 1, wherein the step of identifying an access request from a client device to establish a virtual private network connection through the core network portion by means of the network interface device comprises the step of monitoring data flow from the plurality of antennas to the plurality of core network portions.

3. The method according to claim 2, wherein the step of monitoring data flow from the plurality of antennas to the plurality of core network portions comprises performing deep packet inspection.

4. The method according to one of claim 1, wherein the step of comparing the application information to a network information of the core network portion to determine whether the application information matches the network information by means of the network interface device comprises the step of determining whether the application information matches an entry in a look-up table provided in the network interface device, wherein the entry in the look-up table further includes the network information.

5. The method according to claim 4, wherein the method further comprises the step of updating the look-up table provided in the network interface device by adding a new entry in the look-up table including the application information and the information valid in the virtual private network connection of the client device, if the application information does not match the network information.

6. The method according to claim 1, wherein the application information comprises a destination IP address and wherein the network information and the information valid in virtual private network connection of the client device comprise common network addresses.

7. The method according to claim 6, wherein the step of translating the application information into an information valid in the virtual private network connection of the client device and establishing a virtual private connection of the client device if the application information does not match the network information comprises performing IP translation.

8. A system for facilitating the establishment of a virtual private network in a cellular communication network, the cellular communication network comprising a plurality of core network portions and a plurality of antennas, each antenna being associated with a core network portion, wherein the system further comprises a network interface device arranged in close proximity to the plurality of antennas, and part of a mobile backhauling of the core network portions, the network interface device comprising an identifier configured to identify the access request from a client device to establish a virtual private network connection through a core network portion, a determiner configured to determine application information from the client device, a comparer configured to compare the application information to a network information of the core network portion to determine whether the application information matches the network information, a first connector configured to establish a virtual private network connection of the client device through the core network portion using the application information if the application information matches the network information, a translator configured to translate the application information into an information valid in the virtual private network connection of the client device if the application information does not match the network information and a second connector configured to establish a virtual private connection of the client device using the information valid in the virtual private network connection of the client device if the application information does not match the network information, wherein the network interface device routes data from the client device to the core network portion via a tunnel established between the core network portion and the respective antenna.

9. The system according to claim 8, wherein the identifier includes a monitor configured to monitor data flow from the plurality of antennas to the plurality of core network portions.

10. The system according to claim 9, monitor comprises a member configured to perform deep packet inspection.

11. The system according to claim 8, wherein the network interface device further comprises a storage unit in which a look-up table is stored and wherein the comparer determines whether the application information matches an entry in the look-up table, wherein the entry in the look-up table further comprises the network information.

12. The system according to claim 11, wherein the network interface device further comprises an updating means for updating the look-up table provided in the network interface device, which comprises a writer configured to add a new entry in the look-up table comprising the application information and the information valid in the virtual private network connection of the client device if the application information does not match the network information.

13. The system according to claim 8, wherein the application information comprises a destination IP address and wherein the network information and the information valid in the virtual private network connection of the client device comprise common network addresses.

14. The system according to claim 13, wherein the translator comprises a network address translation device.

* * * * *

UNITED STATES PATENT AND TRADEMARK OFFICE
CERTIFICATE OF CORRECTION

PATENT NO. : 9,913,304 B2
APPLICATION NO. : 14/818823
DATED : March 6, 2018
INVENTOR(S) : Andrew Sergeev et al.

Page 1 of 1

It is certified that error appears in the above-identified patent and that said Letters Patent is hereby corrected as shown below:

On the Title Page

Column 1, Item (73) Assignee, Line 1, delete "Adva Opticai Networking SE," and insert -- Adva Optical Networking SE, --

In the Claims

Column 11, Line 9, Claim 4, after "to" delete "one of"

Column 12, Line 25, Claim 10, after "claim 9," insert -- wherein the --

Column 12, Lines 34-35, Claim 12, delete "an updating means for updating the look-up table" and insert -- an updator configured to update the look-up table --

Signed and Sealed this
Twenty-second Day of May, 2018

Andrei Iancu
*Director of the United States Patent and Trademark Office*